(12) United States Patent
Koo (10) Patent No.: US 11,465,601 B2
(45) Date of Patent: Oct. 11, 2022

(54) ELECTRONIC HYDRAULIC BRAKE DEVICE

(71) Applicant: HYUNDAI MOBIS Co., Ltd., Seoul (KR)

(72) Inventor: Chang Hoe Koo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 144 days.

(21) Appl. No.: 16/788,076

(22) Filed: Feb. 11, 2020

(65) Prior Publication Data
US 2021/0053542 A1    Feb. 25, 2021

(30) Foreign Application Priority Data
Aug. 23, 2019 (KR) .................. 10-2019-0103540

(51) Int. Cl.
*B60T 13/74* (2006.01)
*B60T 13/66* (2006.01)
*B60T 13/14* (2006.01)

(52) U.S. Cl.
CPC .......... *B60T 13/745* (2013.01); *B60T 13/142* (2013.01); *B60T 13/66* (2013.01)

(58) Field of Classification Search
CPC .... B60T 13/745; B60T 11/22; B60T 2270/40; B60T 2270/402; B60T 2270/404
See application file for complete search history.

(56) References Cited

U.S. PATENT DOCUMENTS

| | | | | |
|---|---|---|---|---|
| 3,423,939 A * | 1/1969 | Ferrell | ............ | B60T 11/22 60/588 |
| 10,576,943 B2 * | 3/2020 | Feigel | ............ | B60T 13/745 |
| 2014/0333124 A1 * | 11/2014 | Koo | ............ | B60T 13/686 303/10 |
| 2014/0354036 A1 * | 12/2014 | Koo | ............ | B60T 13/745 303/6.01 |
| 2015/0137588 A1 * | 5/2015 | Koo | ............ | B60T 8/4081 303/14 |
| 2016/0221559 A1 * | 8/2016 | Kim | ............ | B60T 8/4072 |
| 2019/0092301 A1 | 3/2019 | Jeong et al. | | |

(Continued)

FOREIGN PATENT DOCUMENTS

| | | |
|---|---|---|
| KR | 1020070104982 | 10/2007 |
| KR | 10-2014-0134570 | 11/2014 |

(Continued)

*Primary Examiner* — Bradley T King
(74) *Attorney, Agent, or Firm* — H.C. Park & Associates, PLC (57) ABSTRACT

An electronic hydraulic brake device includes: a pedal master to generate hydraulic pressure through pressurization of a pedal and including first and second master chambers; a reservoir including first and second reservoirs to store hydraulic fluid; an electric master to generate hydraulic pressure and including forward and backward chambers; a wheel cylinder to provide a braking force to front and rear wheels; a storage line connecting the pedal master and the reservoir to guide hydraulic fluid; a forward chamber line connecting the first master chamber, the forward chamber, and the wheel cylinder to guide hydraulic fluid; a backward chamber line connecting the second master chamber, the backward chamber, and the wheel cylinder to guide hydraulic fluid; and a connector selectively connecting the forward chamber line and the backward chamber line to guide hydraulic fluid.

15 Claims, 4 Drawing Sheets

(56) References Cited

U.S. PATENT DOCUMENTS

| | | | | |
|---|---|---|---|---|
| 2019/0366997 A1* | 12/2019 | Jeong | ................... | B60T 13/686 |
| 2020/0353910 A1* | 11/2020 | Seol | ....................... | B60T 7/06 |
| 2021/0001829 A1* | 1/2021 | Seol | ...................... | B60T 17/22 |
| 2021/0053543 A1* | 2/2021 | Seol | ..................... | B60T 13/146 |
| 2021/0070262 A1* | 3/2021 | Seol | ....................... | B60T 8/94 |
| 2021/0101575 A1* | 4/2021 | Ahn | ..................... | B60T 13/745 |

FOREIGN PATENT DOCUMENTS

| | | |
|---|---|---|
| KR | 10-2016-0028043 | 3/2016 |
| KR | 10-2019-0034931 | 4/2019 |

\* cited by examiner

ELECTRONIC HYDRAULIC BRAKE DEVICE

CROSS-REFERENCE TO RELATED APPLICATION

This application claims priority from and the benefit of Korean Patent Application No. 10-2019-0103540, filed Aug. 23, 2019, which is hereby incorporated by reference for all purposes as if fully set forth herein.

BACKGROUND

Field

Exemplary embodiments generally relate to an electronic hydraulic brake device, and, more particularly, to an electronic hydraulic brake device that can reduce the number of valve operations during a braking process and improve braking responsiveness.

Discussion

An electronic hydraulic brake device generally refers to a device that adjusts braking pressure to each wheel using hydraulic pressure of a master cylinder that is driven by a motor in response to a driver's pedal pressure being sensed through a sensor. The electronic hydraulic brake device typically includes a sensor for sensing a stroke of the pedal such that a driver can recognize desired braking pressure. The electronic hydraulic brake device may also include a pedal travel simulator that enables the driver to feel the same pedal pressure as in a general hydraulic brake device. Therefore, in response to the driver stepping on the brake pedal, an electronic control unit senses the operation and supplies hydraulic pressure to the master cylinder. The master cylinder transfers braking pressure to wheel cylinders of the respective wheels to provide a braking force to the wheels.

In some electronic hydraulic brake devices, a plurality of valves may be used to individually provide braking pressure to the respective wheels. For instance, Korean Patent Application Publication No. 10-2007-0104982, laid-open on Oct. 30, 2007, and entitled "Control Apparatus for Valve in Electro-Hydraulic Brake System," discloses an electronic hydraulic brake device. It is noted, however, that as the number of valves increase, an operation error may occur that can degrade braking stability. Therefore, there is a need for a device capable of solving this issue.

The above information disclosed in this section is only for understanding the background of the inventive concepts, and, therefore, may contain information that does not form prior art.

SUMMARY

Some exemplary embodiments provide an electronic hydraulic brake device not only capable of reducing the number of valve operations during a braking process, but also improving braking responsiveness.

Additional aspects will be set forth in the detailed description which follows, and, in part, will be apparent from the disclosure, or may be learned by practice of the inventive concepts.

According to some exemplary embodiments, an electronic hydraulic brake device includes a pedal master, a reservoir, an electric master, a wheel cylinder, a storage line, a forward chamber line, a backward chamber line, and a connector. The pedal master is configured to generate hydraulic pressure through pressurization of a pedal. The pedal master includes a first master chamber and a second master chamber. The reservoir is divided into a first reservoir and a second reservoir to store hydraulic fluid. The electric master is configured to generate hydraulic pressure in response to a piston being reciprocated in a cylinder and an operation of the pedal being sensed to drive a motor. The electric master includes a forward chamber formed in a direction that the piston is configured to move forward and a backward chamber formed in a direction that the piston is configured to move backward. The wheel cylinder is configured to provide a braking force to front wheels and rear wheels. The storage line connects the pedal master and the reservoir to guide hydraulic fluid. The forward chamber line connects the first master chamber, the forward chamber, and the wheel cylinder to guide hydraulic fluid. The backward chamber line connects the second master chamber, the backward chamber, and the wheel cylinder to guide hydraulic fluid. The connector selectively connects the forward chamber line and the backward chamber line to guide hydraulic fluid.

In some exemplary embodiments, the storage line may include: a first storage line connecting the first master chamber and the first reservoir; a second storage line connecting the second master chamber and the second reservoir; and a second storage valve configured to open/close the second storage line.

In some exemplary embodiments, the wheel cylinder may include: a first wheel cylinder configured to provide a braking force to the front wheels, the forward chamber line may be connected to the first wheel cylinder; and a second wheel cylinder configured to provide a braking force to the rear wheels, the backward chamber line may be connected to the second wheel cylinder.

In some exemplary embodiments, the electronic hydraulic brake device may further include a forward chamber collector connecting the forward chamber line and the first reservoir to guide hydraulic fluid, and a backward chamber collector connecting the backward chamber line and the second reservoir to guide hydraulic fluid.

In some exemplary embodiments, the forward chamber line may include: a first forward chamber line connecting the first master chamber and the forward chamber; a first forward chamber valve configured to open/close the first forward chamber line; a second forward chamber line connected to the first forward chamber line; a second forward chamber valve configured to open/close the second forward chamber line; a third forward chamber line connected to the second forward chamber line and a first cylinder of the first wheel cylinder; a third forward chamber valve configured to open/close the third forward chamber line; a fourth forward chamber line connected to the second forward chamber line and a second cylinder of the first wheel cylinder; a fourth forward chamber valve configured to open/close the fourth forward chamber line; a fifth forward chamber line connecting the first reservoir and the second forward chamber line; and a fifth forward chamber valve configured to open/close the fifth forward chamber line.

In some exemplary embodiments, the first forward chamber valve, the second forward chamber valve, the third forward chamber valve, and the fourth forward chamber valve may be normal open valves, and the fifth forward chamber valve may be a normal close valve.

In some exemplary embodiments, the forward chamber collector may include: a third forward chamber collection line connected to the third forward chamber line; a third forward chamber connection valve configured to open/close the third forward chamber collection line; a fourth forward chamber collection line connected to the fourth forward chamber line; a fourth forward chamber collection valve configured to open/close the fourth forward chamber collection line; a fifth forward chamber collection line connecting the third forward chamber collection line and the fourth forward chamber collection line; and a sixth forward chamber collection line connecting the fifth forward chamber collection line and the first reservoir.

In some exemplary embodiments, the third forward chamber collection valve and the fourth forward chamber collection valve may be normal close valves.

In some exemplary embodiments, the backward chamber line may include: a first backward chamber line connecting the second master chamber and the backward chamber; a first backward chamber valve configured to open/close the first backward chamber line; a second backward chamber line connected to the first backward chamber line; a second backward chamber valve configured to open/close the second backward chamber line; a third backward chamber line connected to the second backward chamber line and a first cylinder of the second wheel cylinder; a third backward chamber valve configured to open/close the third backward chamber line; a fourth backward chamber line connected to the second backward chamber line and a second cylinder of the second wheel cylinder; and a fourth backward chamber valve configured to open/close the fourth backward chamber line.

In some exemplary embodiments, the first backward chamber valve, the second backward chamber valve, the third backward chamber valve, and the fourth backward chamber valve may be normal open valves.

In some exemplary embodiments, the backward chamber collector may include: a third backward chamber collection line connected to the third backward chamber line; a third backward chamber collection valve configured to open/close the third backward chamber collection line; a fourth backward chamber collection line connected to the fourth backward chamber line; a fourth backward chamber collection valve configured to open/close the fourth backward chamber collection line; a fifth backward chamber collection line connecting the third backward chamber collection line and the fourth backward chamber collection line; and a sixth backward chamber collection line connecting the fifth backward chamber collection line and the second reservoir.

In some exemplary embodiments, the third backward chamber collection valve and the fourth backward chamber collection valve may be normal close valves.

In some exemplary embodiments, the connector may include a connection line and a connection valve. The connection line may include: a first end connected to the forward chamber line and configured to guide hydraulic fluid between the electric master and the first wheel cylinder; and a second end connected to the backward chamber line and configured to guide hydraulic fluid between the electric master and the second wheel cylinder. The connection valve may be configured to open/close the connection line.

In some exemplary embodiments, the connection valve may be a normal close valve.

In an electronic hydraulic brake device according to various exemplary embodiments, a forward chamber formed in a forward direction of a double acting piston may be connected to a first reservoir that makes it possible to reduce the number of operating valves during general braking. Furthermore, the forward chamber and a first wheel cylinder can be connected to improve braking responsiveness.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATE EMBODIMENTS

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

Figure 1:
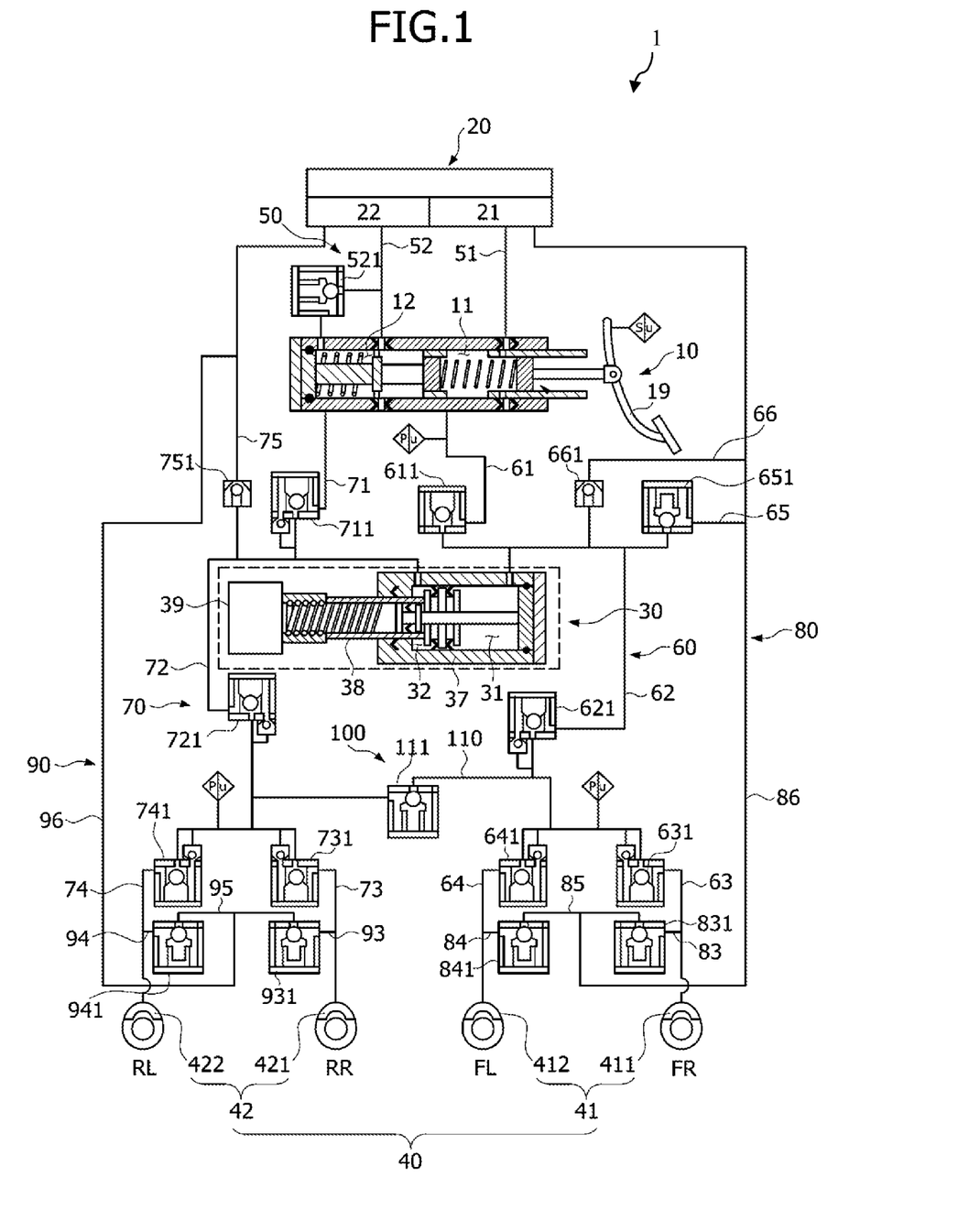
FIG. 1 is a diagram schematically illustrating an electronic hydraulic brake device according to some exemplary embodiments.

FIG. 1 is a diagram schematically illustrating an electronic hydraulic brake device 1 according to some exemplary embodiments. Referring to FIG. 1, the electronic hydraulic brake device 1 in accordance with some exemplary embodiments includes a pedal master 10, a reservoir 20, an electric master 30, a wheel cylinder 40, a storage line 50, a forward chamber line 60, a backward chamber line 70, and a connector 100.

The pedal master 10 generates hydraulic pressure as a pedal 19 is pressed. The pedal master 10 may have a first master chamber 11 and a second master chamber 12, in which a hydraulic fluid (e.g., oil) is divided and stored. Hereinafter, the hydraulic fluid will be referred to as oil. The first and second master chambers 11 and 12 may individually generate hydraulic pressure when the pedal 19 is operated.

The reservoir 20 stores oil therein. The reservoir 20 may include a first reservoir 21 and a second reservoir 22, which are formed by dividing the reservoir 20, and that collect excessive hydraulic pressure generated by a hydraulic system.

The electric master 30 generates hydraulic pressure. For instance, in response to an operation of the pedal 19 being sensed to drive a motor 39, hydraulic pressure is generated while a piston 38 is reciprocated in a cylinder 37. At this time, a forward chamber 31 is formed in the direction that the piston 38 moves forward, and a backward chamber 32 is formed in the direction that the piston 38 moves backward. Such an electric master 30 may have an effective cross-sectional area, which is varied depending on a high-pressure section and a low-pressure section, and, thus, can reduce the capacity and weight of the motor 39 and secure relatively fast responsiveness.

The wheel cylinder 40 provides a braking force to front wheels and rear wheels. For example, the wheel cylinder 40 may be formed at two front wheels and two rear wheels, and provide a braking force using hydraulic pressure.

In some exemplary embodiments, the wheel cylinder 40 includes a first wheel cylinder 41 and a second wheel cylinder 42. The first wheel cylinder 41 provides a braking force to the front wheels, and the second wheel cylinder 42 provides a braking force to the rear wheels. For example, the first wheel cylinder 41 may include a front right wheel cylinder 411 for providing a braking force to the right front wheel and a front left wheel cylinder 412 for providing a braking force to the left front wheel. The second wheel cylinder 42 may include a rear right wheel cylinder 421 for providing a braking force to the right rear wheel and a rear left wheel cylinder 422 for providing a braking force to the left rear wheel. The first wheel cylinder 41 may provide a braking force to any one of the front wheels and any one of the rear wheels. The second wheel cylinder 42 may provide a braking force to the other one of the front wheels and the other one of the rear wheels.

The storage line 50 connects the pedal master 10 and the reservoir 20 to guide oil. The forward chamber line 60 connects the pedal master 10, the electric master 30, and the first wheel cylinder 41 to guide oil. The backward chamber line 70 connects the pedal master 10, the electric master 30, and the second wheel cylinder 42 to guide oil.

The connector 100 selectively connects the forward chamber line 60 and the backward chamber line 70 to guide oil.

The electronic hydraulic brake device 1 in accordance with some exemplary embodiments may further include a forward chamber collector 80 and a backward chamber collector 90. The forward chamber collector 80 connects the forward chamber line 60 and the first reservoir 21 to guide oil, and the backward chamber collector 90 connects the backward chamber line 70 and the second reservoir 22 to guide oil.

The storage line 50 in accordance with some exemplary embodiments includes a first storage line 51 and a second storage line 52. The first storage line 51 connects the first master chamber 11 and the first reservoir 21. The second storage line 52 connects the second master chamber 12 and the second reservoir 22. A second storage valve 521 formed on the second storage line 52 opens/closes the second storage line 52. For example, the second storage line 52 has one end connected to the second reservoir 22 and the other end diverging as a pair of lines and connected to the second master chamber 12. The second storage valve 521 may be disposed on any one of the pair of diverging lines.

The forward chamber line 60 in accordance with some exemplary embodiments includes a first forward chamber line 61, a second forward chamber line 62, a third forward chamber line 63, a fourth forward chamber line 64, and a fifth forward chamber line 65.

The first forward chamber line 61 connects the first master chamber 11 and the forward chamber 31, and a first forward chamber valve 611 formed on the first forward chamber line 61 opens/closes the first forward chamber line 61.

The second forward chamber line 62 is connected to the first forward chamber line 61, and a second forward chamber valve 621 formed on the second forward chamber line 62 opens/closes the second forward chamber line 62. For example, the second forward chamber line 62 may be connected to the first forward chamber line 61 connecting the first forward chamber valve 611 and the forward chamber 31.

The third forward chamber line 63 is connected to any one of the second forward chamber line 62 and the first wheel cylinder 41, and a third forward chamber valve 631 formed on the third forward chamber line 63 opens/closes the third forward chamber line 63. For example, the third forward chamber line 63 may diverge from the second forward chamber line 62, and connect to the front right wheel cylinder 411.

The fourth forward chamber line 64 is connected to the other one of the second forward chamber line 62 and the first wheel cylinder 41, and a fourth forward chamber valve 641 formed on the fourth forward chamber line 64 opens/closes the fourth forward chamber line 64. For example, the fourth forward chamber line 64 may diverge from the second forward chamber line 62, and connect to the front left wheel cylinder 412.

The fifth forward chamber line 65 connects the first reservoir 21 and the second forward chamber line 62, and a fifth forward chamber valve 651 formed on the fifth forward chamber line 65 opens/closes the fifth forward chamber line 65. For example, the fifth forward chamber line 65 may have one end connected to the first reservoir 21 and the other end connected to the second forward chamber line 62 connecting the first forward chamber line 61 and the second forward chamber valve 621.

The forward chamber line 60 may further include a sixth forward chamber line 66. The sixth forward chamber line 66 connects the second forward chamber line 62 and the fifth forward chamber line 65, and a sixth forward chamber valve 661 formed on the sixth forward chamber line 66 restricts the movement of oil in one direction. For example, the sixth forward chamber line 66 may have one end connected to the fifth forward chamber line 65 connecting the first reservoir 21 and the fifth forward chamber valve 651 and the other end connected to the second forward chamber line 62 connecting the first forward chamber line 61 and the second forward chamber valve 621.

According to some exemplary embodiments, normal open valves that open the lines when no power is applied may be used as the first forward chamber valve 611, the second forward chamber valve 621, the third forward chamber valve 631, and the fourth forward chamber valve 641. Furthermore, a normal close valve that closes the line when no power is applied may be used as the fifth forward chamber valve 651.

The forward chamber collector 80 in accordance with some exemplary embodiments includes a third forward chamber collection line 83, a fourth forward chamber collection line 84, a fifth forward chamber collection line 85, and a sixth forward chamber collection line 86.

The third forward chamber collection line 83 is connected to the third forward chamber line 63, and a third forward chamber collection valve 831 formed on the third forward chamber collection line 83 opens/closes the third forward chamber collection line 83. For example, the third forward chamber collection line 83 may be connected to the third forward chamber line 63 connecting the third forward chamber valve 631 and the front right wheel cylinder 411.

The fourth forward chamber collection line 84 is connected to the fourth forward chamber line 64, and a fourth forward chamber collection valve 841 formed on the fourth forward chamber collection line 84 opens/closes the fourth forward chamber collection line 84. For example, the fourth forward chamber collection line 84 may be connected to the fourth forward chamber line 64 connecting the fourth forward chamber valve 641 and the front left wheel cylinder 412.

The fifth forward chamber collection line 85 connects the third forward chamber collection line 83 and the fourth forward chamber collection line 84, and the sixth forward chamber collection line 86 connects the fifth forward chamber collection line 85 and the first reservoir 21. For example, the sixth forward chamber collection line 86 may be connected to the fifth forward chamber line 65 connecting the first reservoir 21 and the fifth forward chamber valve 651.

In some exemplary embodiments, normal close valves that close the lines when no power is applied may be used as the third forward chamber collection valve 831 and the fourth forward chamber collection valve 841.

The backward chamber line 70 in accordance with some exemplary embodiments includes a first backward chamber line 71, a second backward chamber line 72, a third backward chamber line 73, and a fourth backward chamber line 74.

The first backward chamber line 71 connects the second master chamber 12 and the backward chamber 32, and a first backward chamber valve 711 formed on the first backward chamber line 71 opens/closes the first backward chamber line 71.

The second backward chamber line 72 is connected to the first backward chamber line 71, and a second backward chamber valve 721 formed on the second backward chamber line 72 opens/closes the second backward chamber line 72. For example, the second backward chamber line 72 may be connected to the first backward chamber line 71 connecting the first backward chamber valve 711 and the backward chamber 32.

The third backward chamber line 73 is connected to any one of the second backward chamber line 72 and the second wheel cylinder 42, and a third backward chamber valve 731 formed on the third backward chamber line 73 opens/closes the third backward chamber line 73. For example, the third backward chamber line 73 may diverge from the second backward chamber line 72 and connect to the rear right wheel cylinder 421.

The fourth backward chamber line 74 is connected to any one of the second backward chamber line 72 and the second wheel cylinder 42, and a fourth backward chamber valve 741 formed on the fourth backward chamber line 74 opens/closes the fourth backward chamber line 74. For example, the fourth backward chamber line 74 may diverge from the second backward chamber line 72 and connect to the rear left wheel cylinder 422.

The fifth backward chamber line 75 connects the second reservoir 22 and the second backward chamber line 72, and a fifth backward chamber valve 751 formed on the fifth backward chamber line 75 restricts the movement of oil in one direction. For example, the fifth backward chamber line 75 may be connected to the second backward chamber line 72 connecting the first backward chamber line 71 and the second backward chamber valve 721.

According to some exemplary embodiments, normal open valves that open the lines when no power is applied may be used as the first backward chamber valve 711, the second backward chamber valve 721, the third backward chamber valve 731, and the fourth backward chamber valve 741.

The backward chamber collector 90 in accordance with some exemplary embodiments includes a third backward chamber collection line 93, a fourth backward chamber collection line 94, a fifth backward chamber collection line 95, and a sixth backward chamber collection line 96.

The third backward chamber collection line 93 is connected to the third backward chamber line 73, and a third backward chamber collection valve 931 formed on the third backward chamber collection line 93 opens/closes the third backward chamber collection line 93. For example, the third backward chamber collection line 93 may be connected to the third backward chamber line 73 connecting the third backward chamber valve 731 and the rear right wheel cylinder 421.

The fourth backward chamber collection line 94 is connected to the fourth backward chamber line 74, and a fourth backward chamber collection valve 941 formed on the fourth backward chamber collection line 94 opens/closes the fourth backward chamber collection line 94. For example, the fourth backward chamber collection line 94 may be connected to the fourth backward chamber line 74 connecting the fourth backward chamber valve 741 and the rear left wheel cylinder 422.

The fifth backward chamber collection line 95 connects the third backward chamber collection line 93 and the fourth backward chamber collection line 94, and the sixth backward chamber collection line 96 connects the fifth backward chamber collection line 95 and the second reservoir 22. For example, the sixth backward chamber collection line 96 may be connected to the fifth backward chamber line 75 connecting the second reservoir 22 and the fifth backward chamber valve 751.

According to some exemplary embodiments, normal close valves that close the lines when no power is applied may be used as the third backward chamber collection valve 931 and the fourth backward chamber collection valve 941.

The connector 100 in accordance with some exemplary embodiments includes a connection line 110 and a connection valve 111.

One end of the connection line 110 is connected to the forward chamber line 60 that guides oil between the electric master 30 and the first wheel cylinder 41, and the other end of the connection line 110 is connected to the backward chamber line 70 that guides oil between the electric master 30 and the second wheel cylinder 42. The connection valve 111 is formed on the connection line 110 to open/close the connection line 110. According to some exemplary embodiments, a normal close valve that closes the connection line 110 when no power is applied may be used as the connection valve 111. For example, the connection line 110 may connect the second forward chamber line 62 passing through the second forward chamber valve 621 to the second backward chamber line 72 passing through the second backward chamber valve 721.

Figure 2:
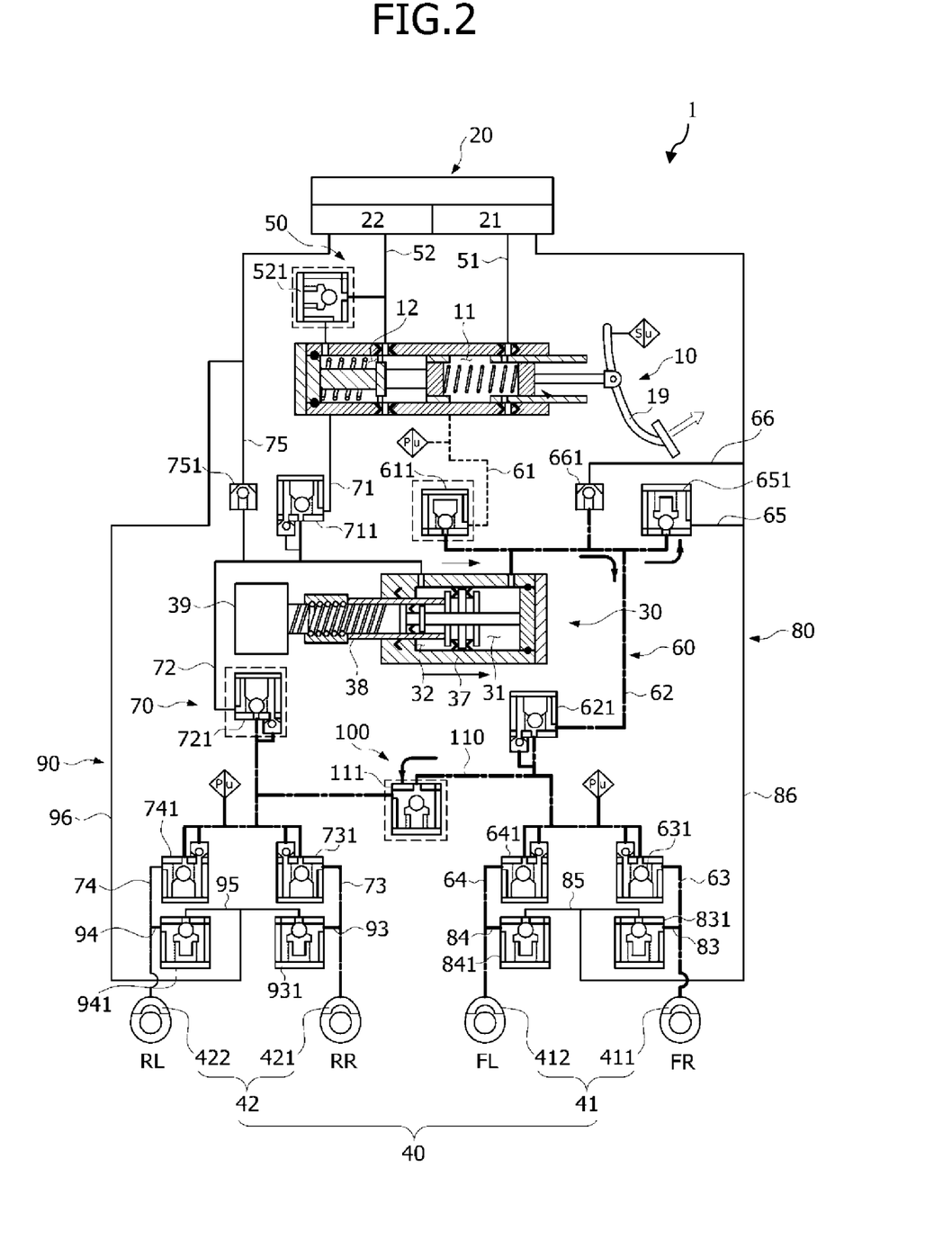
FIG. 2 is a diagram schematically illustrating a first boosting state in the electronic hydraulic brake device of FIG. 1 according to some exemplary embodiments.

FIG. 2 is a diagram schematically illustrating a first boosting state in the electronic hydraulic brake device according to some exemplary embodiments. Referring to FIG. 2, power is applied to the second backward chamber valve 721 at the same time as an input of the pedal 19, and the second backward chamber line 72 is closed. In this state, when the motor 39 is driven so that the piston 38 raises hydraulic pressure, oil stored in the forward chamber 31 reaches the first wheel cylinder 41 and the second wheel cylinder 42 through the forward chamber line 60 and the backward chamber line 70.

Figure 3:
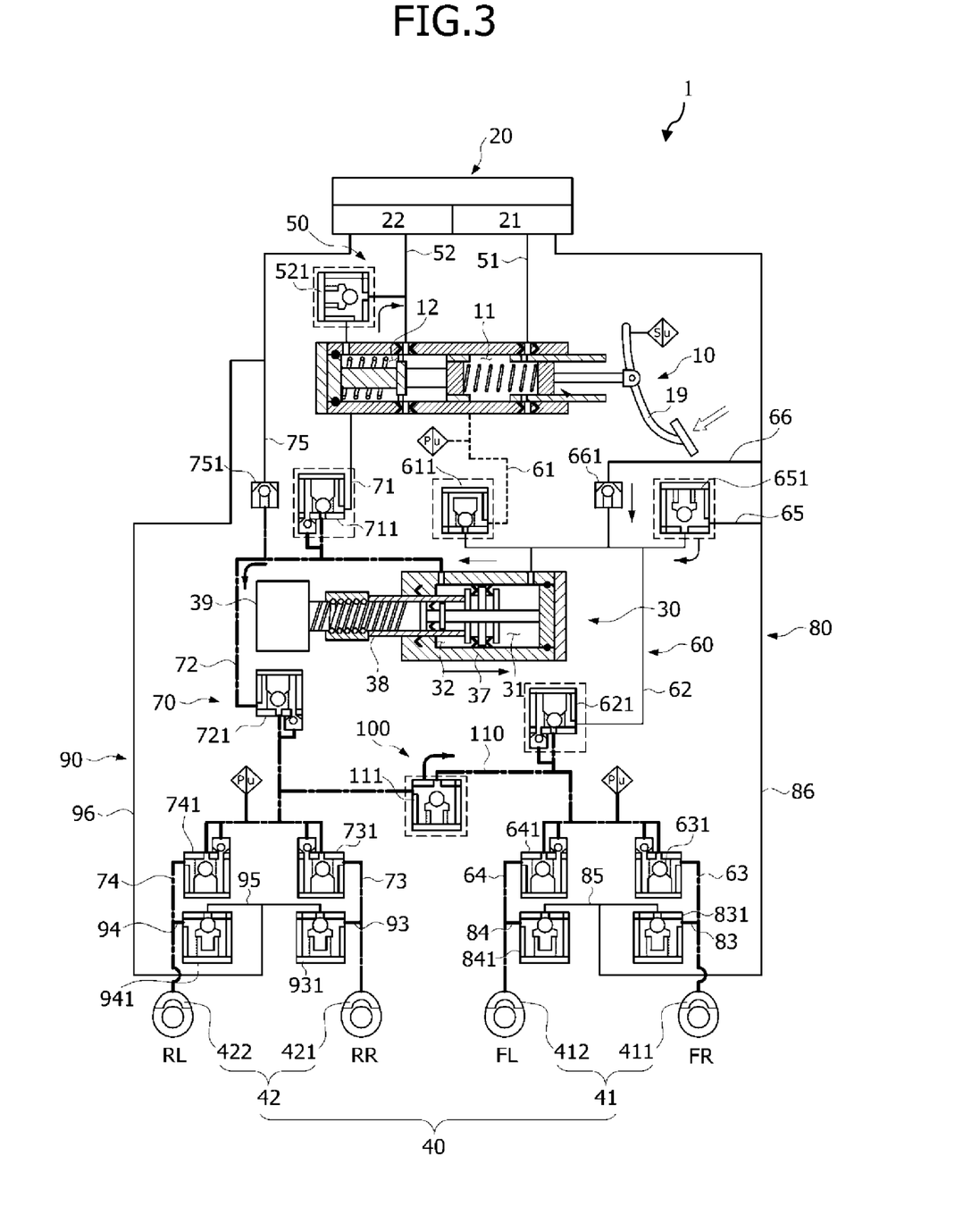
FIG. 3 is a diagram schematically illustrating a second boosting state in the electronic hydraulic brake device of FIG. 1 according to some exemplary embodiments.

FIG. 3 is a diagram schematically illustrating a second boosting state in the electronic hydraulic brake device in accordance with some exemplary embodiments. In the second boosting state illustrated in FIG. 3, power is applied to the second forward chamber valve 621 to close the second forward chamber line 62, power is applied to the fifth forward chamber valve 651 to open the fifth forward chamber line 65, and power is applied to the first backward chamber valve 711 to close the first backward chamber line 71. The power applied to the second backward chamber valve 721 is removed to open the second backward chamber line 72. In this state, when the motor 39 is driven so that the piston 38 raises hydraulic pressure of the backward chamber 32, oil stored in the backward chamber 32 reaches the second wheel cylinder 42 and the first wheel cylinder 41 through the backward chamber line 70 and the forward chamber line 60.

Figure 4:
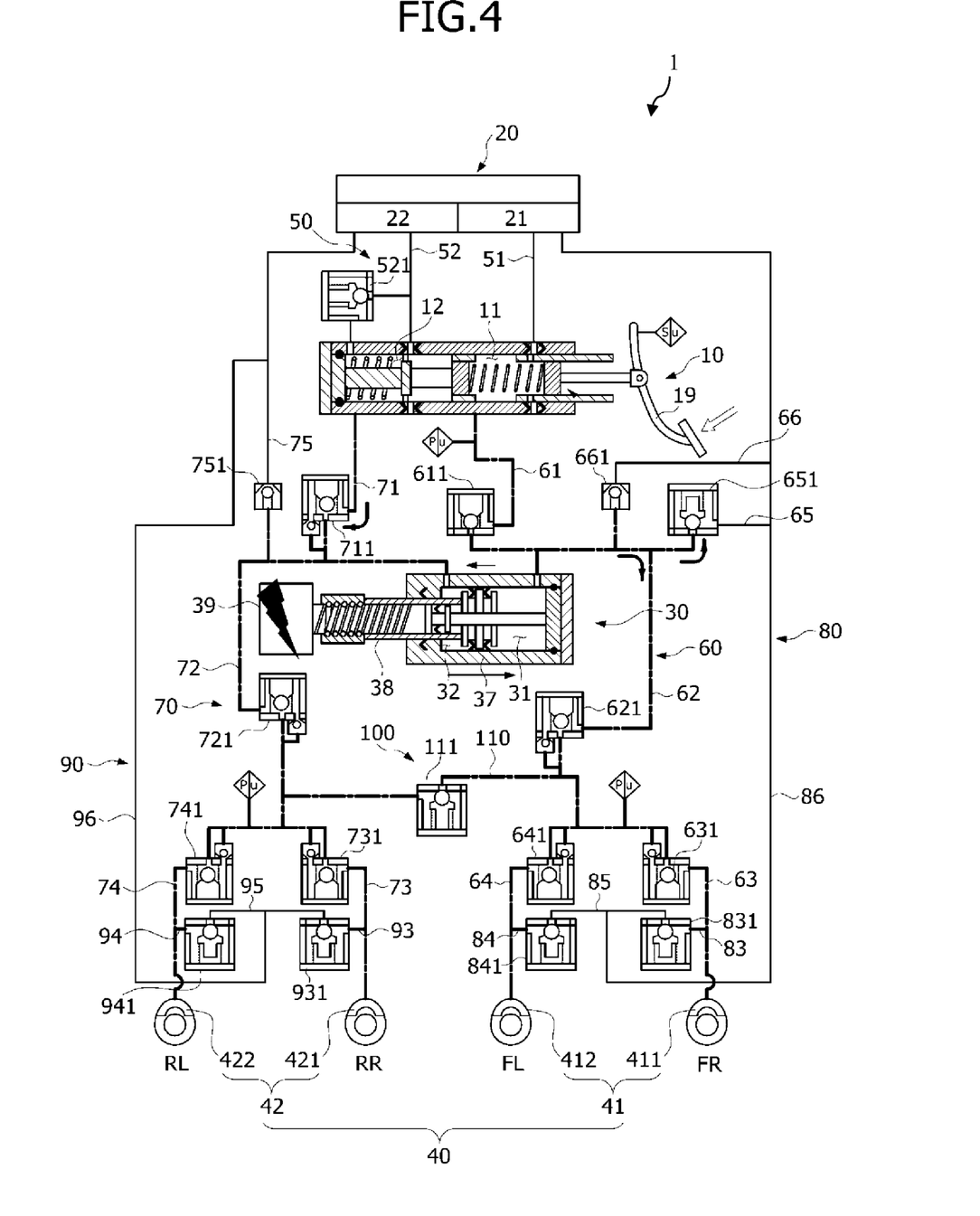
FIG. 4 is a diagram schematically illustrating a braking state by pedal pressure in the electronic hydraulic brake device of FIG. 1 according to some exemplary embodiments.

FIG. 4 is a diagram schematically illustrating a braking state by pedal pressure in the electronic hydraulic brake device in accordance with some exemplary embodiments. Referring to FIG. 4, when the pedal 19 is operated, oil pressurized by the first master chamber 11 is supplied to the first wheel cylinder 41 through the forward chamber line 60, and oil pressurized by the second master chamber 12 is supplied to the second wheel cylinder 42 through the backward chamber line 70. At this time, the backward chamber 32 may be pressurized by the oil supplied to the forward chamber 31, thereby preventing a braking pressure loss.

In the electronic hydraulic brake device 1 in accordance with some exemplary embodiments, the forward chamber 31 formed in the forward direction of the double acting piston 38 is connected to the first reservoir 21, which makes it possible to reduce the number of operating valves during general braking. Furthermore, the forward chamber 31 and the first wheel cylinder 41 can be connected to improve the braking responsiveness.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An electronic hydraulic brake device comprising:
   a pedal master configured to generate hydraulic pressure through pressurization of a pedal, the pedal master comprising a first master chamber and a second master chamber;
   a reservoir divided into a first reservoir and a second reservoir to store hydraulic fluid;
   an electric master configured to generate hydraulic pressure in response to a piston being reciprocated in a cylinder and an operation of the pedal being sensed to drive a motor, the electric master comprising a forward chamber formed in a direction that the piston is configured to move forward and a backward chamber formed in a direction that the piston is configured to move backward;
   a wheel cylinder configured to provide a braking force to front wheels and rear wheels;
   a storage line connecting the pedal master and the reservoir to guide hydraulic fluid;
   a forward chamber line connecting the first master chamber, the forward chamber, and the wheel cylinder to guide hydraulic fluid;
   a backward chamber line connecting the second master chamber, the backward chamber, and the wheel cylinder to guide hydraulic fluid; and
   a connector selectively connecting the forward chamber line and the backward chamber line to guide hydraulic fluid,
   wherein the forward chamber line comprises:
      a first forward chamber line connecting the first master chamber and the forward chamber;
      a first forward chamber valve configured to open/close the first forward chamber line;
      a second forward chamber line connected to the first forward chamber line;
      a second forward chamber valve configured to open/close the second forward chamber line;
      a third forward chamber line connected to the second forward chamber line and the wheel cylinder; and
      a third forward chamber valve configured to open/close the third forward chamber line,
   wherein the second forward chamber line comprises:
      a first end directly connected to each of the forward chamber and the first forward chamber valve; and
      a second end directly connected to the second forward chamber valve, and
   wherein the storage line comprises:
      a first storage line connecting the first master chamber and the first reservoir;
      a second storage line connecting the second master chamber and the second reservoir; and
      a second storage valve configured to open/close the second storage line.

2. The electronic hydraulic brake device of claim 1, wherein:
   the wheel cylinder comprises:
      a first wheel cylinder configured to provide a braking force to the front wheels; and
      a second wheel cylinder configured to provide a braking force to the rear wheels,
   the forward chamber line is connected to the first wheel cylinder; and
   the backward chamber line is connected to the second wheel cylinder.

3. The electronic hydraulic brake device of claim 2, further comprising:
   a forward chamber collector connecting the forward chamber line and the first reservoir to guide hydraulic fluid; and
   a backward chamber collector connecting the backward chamber line and the second reservoir to guide hydraulic fluid.

4. The electronic hydraulic brake device of claim 3, wherein the forward chamber line comprises:
   a fourth forward chamber line connected to the second forward chamber line and a second cylinder of the first wheel cylinder;

a fourth forward chamber valve configured to open/close the fourth forward chamber line;
a fifth forward chamber line connecting the first reservoir and the second forward chamber line; and
a fifth forward chamber valve configured to open/close the fifth forward chamber line.

5. The electronic hydraulic brake device of claim 4, wherein:
the first forward chamber valve, the second forward chamber valve, the third forward chamber valve, and the fourth forward chamber valve are normal open valves; and
the fifth forward chamber valve is a normal close valve.

6. The electronic hydraulic brake device of claim 4, wherein the forward chamber collector comprises:
a third forward chamber collection line connected to the third forward chamber line;
a third forward chamber collection valve configured to open/close the third forward chamber collection line;
a fourth forward chamber collection line connected to the fourth forward chamber line;
a fourth forward chamber collection valve configured to open/close the fourth forward chamber collection line;
a fifth forward chamber collection line connecting the third forward chamber collection line and the fourth forward chamber collection line; and
a sixth forward chamber collection line connecting the fifth forward chamber collection line and the first reservoir.

7. The electronic hydraulic brake device of claim 6, wherein the third forward chamber collection valve and the fourth forward chamber collection valve are normal close valves.

8. The electronic hydraulic brake device of claim 3, wherein the backward chamber line comprises:
a first backward chamber line connecting the second master chamber and the backward chamber;
a first backward chamber valve configured to open/close the first backward chamber line;
a second backward chamber line connected to the first backward chamber line;
a second backward chamber valve configured to open/close the second backward chamber line;
a third backward chamber line connected to the second backward chamber line and a first cylinder of the second wheel cylinder;
a third backward chamber valve configured to open/close the third backward chamber line;
a fourth backward chamber line connected to the second backward chamber line and a second cylinder of the second wheel cylinder; and
a fourth backward chamber valve configured to open/close the fourth backward chamber line.

9. The electronic hydraulic brake device of claim 8, wherein the first backward chamber valve, the second backward chamber valve, the third backward chamber valve, and the fourth backward chamber valve are normal open valves.

10. The electronic hydraulic brake device of claim 8, wherein the backward chamber collector comprises:
a third backward chamber collection line connected to the third backward chamber line;
a third backward chamber collection valve configured to open/close the third backward chamber collection line;
a fourth backward chamber collection line connected to the fourth backward chamber line;
a fourth backward chamber collection valve configured to open/close the fourth backward chamber collection line;
a fifth backward chamber collection line connecting the third backward chamber collection line and the fourth backward chamber collection line; and
a sixth backward chamber collection line connecting the fifth backward chamber collection line and the second reservoir.

11. The electronic hydraulic brake device of claim 10, wherein the third backward chamber collection valve and the fourth backward chamber collection valve are normal close valves.

12. The electronic hydraulic brake device of claim 2, wherein the connector comprises:
a connection line comprising:
a first end connected to the forward chamber line and configured to guide hydraulic fluid between the electric master and the first wheel cylinder; and
a second end connected to the backward chamber line and configured to guide hydraulic fluid between the electric master and the second wheel cylinder; and
a connection valve configured to open/close the connection line.

13. The electronic hydraulic brake device of claim 12, wherein the connection valve is a normal close valve.

14. An electronic hydraulic brake device comprising:
a pedal master configured to generate hydraulic pressure through pressurization of a pedal, the pedal master comprising a first master chamber and a second master chamber;
a reservoir divided into a first reservoir and a second reservoir to store hydraulic fluid;
an electric master configured to generate hydraulic pressure in response to a piston being reciprocated in a cylinder and an operation of the pedal being sensed to drive a motor, the electric master comprising a forward chamber formed in a direction that the piston is configured to move forward and a backward chamber formed in a direction that the piston is configured to move backward;
a wheel cylinder configured to provide a braking force to front wheels and rear wheels;
a storage line connecting the pedal master and the reservoir to guide hydraulic fluid;
a forward chamber line connecting the first master chamber, the forward chamber, and the wheel cylinder to guide hydraulic fluid;
a backward chamber line connecting the second master chamber, the backward chamber, and the wheel cylinder to guide hydraulic fluid;
a connector selectively connecting the forward chamber line and the backward chamber line to guide hydraulic fluid;
a forward chamber collector connecting the forward chamber line and the first reservoir to guide hydraulic fluid; and
a backward chamber collector connecting the backward chamber line and the second reservoir to guide hydraulic fluid,
wherein the wheel cylinder comprises:
a first wheel cylinder configured to provide a braking force to the front wheels; and
a second wheel cylinder configured to provide a braking force to the rear wheels,
wherein the forward chamber line is connected to the first wheel cylinder, wherein the backward chamber line is connected to the second wheel cylinder,
wherein the forward chamber line comprises:
a first forward chamber line connecting the first master chamber and the forward chamber;
a first forward chamber valve configured to open/close the first forward chamber line;
a second forward chamber line connected to the first forward chamber line;
a second forward chamber valve configured to open/close the second forward chamber line;
a third forward chamber line connected to the second forward chamber line and the wheel cylinder;
a third forward chamber valve configured to open/close the third forward chamber line,
a fourth forward chamber line connected to the second forward chamber line and a second cylinder of the first wheel cylinder;
a fourth forward chamber valve configured to open/close the fourth forward chamber line;
a fifth forward chamber line connecting the first reservoir and the second forward chamber line; and
a fifth forward chamber valve configured to open/close the fifth forward chamber line,
wherein the forward chamber collector comprises:
a third forward chamber collection line connected to the third forward chamber line;
a third forward chamber collection valve configured to open/close the third forward chamber collection line;
a fourth forward chamber collection line connected to the fourth forward chamber line;
a fourth forward chamber collection valve configured to open/close the fourth forward chamber collection line;
a fifth forward chamber collection line connecting the third forward chamber collection line and the fourth forward chamber collection line; and
a sixth forward chamber collection line connecting the fifth forward chamber collection line and the first reservoir, and
wherein the second forward chamber line comprises:
a first end directly connected to each of the forward chamber and the first forward chamber valve; and
a second end directly connected to the second forward chamber valve.

15. An electronic hydraulic brake device comprising:
a pedal master configured to generate hydraulic pressure through pressurization of a pedal, the pedal master comprising a first master chamber and a second master chamber;
a reservoir divided into a first reservoir and a second reservoir to store hydraulic fluid;
an electric master configured to generate hydraulic pressure in response to a piston being reciprocated in a cylinder and an operation of the pedal being sensed to drive a motor, the electric master comprising a forward chamber formed in a direction that the piston is configured to move forward and a backward chamber formed in a direction that the piston is configured to move backward;
a wheel cylinder configured to provide a braking force to front wheels and rear wheels;
a storage line connecting the pedal master and the reservoir to guide hydraulic fluid;
a forward chamber line connecting the first master chamber, the forward chamber, and the wheel cylinder to guide hydraulic fluid;
a backward chamber line connecting the second master chamber, the backward chamber, and the wheel cylinder to guide hydraulic fluid; and
a connector selectively connecting the forward chamber line and the backward chamber line to guide hydraulic fluid,
wherein the forward chamber line comprises:
a first forward chamber line connecting the first master chamber and the forward chamber;
a first forward chamber valve configured to open/close the first forward chamber line;
a second forward chamber line connected to the first forward chamber line;
a second forward chamber valve configured to open/close the second forward chamber line;
a third forward chamber line connected to the second forward chamber line and the wheel cylinder;
a third forward chamber valve configured to open/close the third forward chamber line;
a fourth forward chamber line connected to the second forward chamber line and a second cylinder of the first wheel cylinder;
a fourth forward chamber valve configured to open/close the fourth forward chamber line;
a fifth forward chamber line connecting the first reservoir and the second forward chamber line;
a fifth forward chamber valve configured to open/close the fifth forward chamber line; and
a sixth forward chamber line connected to the second forward chamber line and the fifth forward chamber line,
wherein the second forward chamber line comprises:
a first end directly connected to each of the forward chamber and the first forward chamber valve; and
a second end directly connected to the second forward chamber valve, and
wherein the wheel cylinder comprises:
a first wheel cylinder configured to provide a braking force to the front wheels; and
a second wheel cylinder configured to provide a braking force to the rear wheels,
wherein the forward chamber line is connected to the first wheel cylinder, and
wherein the backward chamber line is connected to the second wheel cylinder.

* * * * *